(12) United States Patent
Yamane et al.

(10) Patent No.: US 6,341,482 B1
(45) Date of Patent: Jan. 29, 2002

(54) CUTTING BLADE FOR REAPER

(75) Inventors: Yoshiro Yamane, Akashi; Kazuhiko Takemoto; Tadao Yashirodai, both of Kakogawa, all of (JP)

(73) Assignee: Kawasaki Jukogyo Kubushiki Kaisha, Hyogo (JP)

(*) Notice: Subject to any disclaimer, the term of this patent is extended or adjusted under 35 U.S.C. 154(b) by 0 days.

(21) Appl. No.: 09/556,048

(22) Filed: Apr. 21, 2000

(30) Foreign Application Priority Data

Apr. 26, 1999 (JP) ............................................ 11-118623

(51) Int. Cl.[7] ........................... A01D 34/02; A01G 23/00
(52) U.S. Cl. ........................................... 56/296; 173/15
(58) Field of Search ............................ 56/225, 295, 296, 56/DIG. 17, DIG. 20; 30/276, 346; 173/15, 13, 49, 91, 94, 128, 205

(56) References Cited

U.S. PATENT DOCUMENTS 5,488,997 A * 2/1996 Yamada ....................... 173/13

D439,814 S * 4/2001 Yamane et al. ............... D8/8

FOREIGN PATENT DOCUMENTS

| JP | 14-14387 | 6/1939 |
| JP | 06003142 | 1/1994 |
| JP | 7-95827 | 4/1995 |

* cited by examiner

*Primary Examiner*—Robert E. Pezzuto (57) ABSTRACT

A cutting blade is provided for a reaper which can easily position members to be welded, can reduce a welding distortion, can fully ensure the strength of a shank member and can easily be manufactured. The cutting blade comprises a bar-shaped shank member having axially extending grooves formed on an outer peripheral face of a tip portion and having a base end to be fixed to the reaper, and a plate-shaped blade member having a notch portion formed on a base end, wherein the tip portion of the shank member is fitted in the notch portion of the plate-shaped blade member in such a manner that edge portions of the notch portion are fitted in the grooves, and the fitted tip portion of the shank member is welded to a portion of the plate-shaped blade member which is located around the tip portion.

2 Claims, 7 Drawing Sheets

CUTTING BLADE FOR REAPER

BACKGROUND OF THE INVENTION

1. Field of Invention

The invention relates to a cutting blade for a reaper that serves to cut fruit, branches, roots or the like of plants by reciprocation of the cutting blade.

2. Description of the Related Art

Figure 5A:
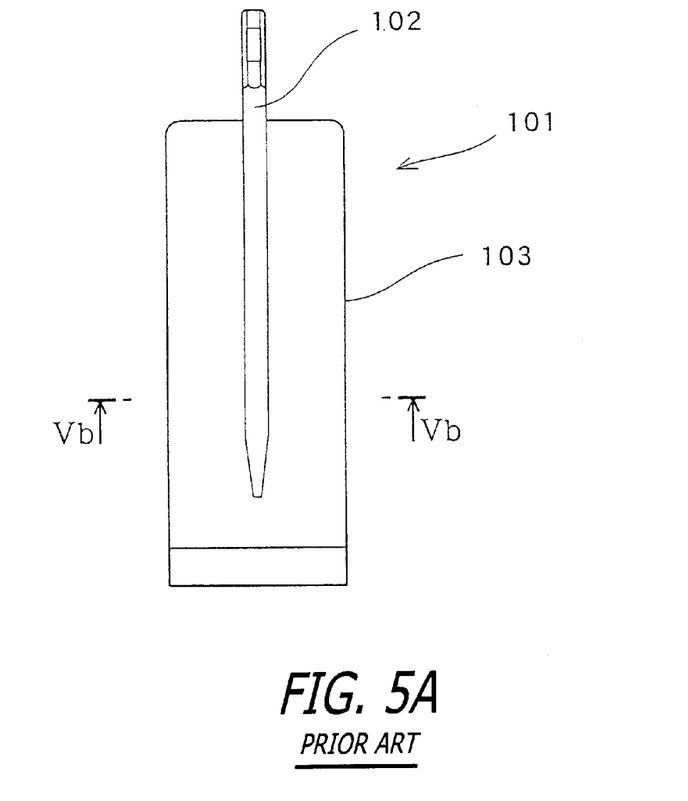
FIGS. 5A, 5B are views showing the structure of a cutting blade for a root cutter according to the prior art, FIG. 5A being a front view, and FIG. 5B being a sectional view taken along the line Vb—Vb in FIG. 5A.
Figure 5B:
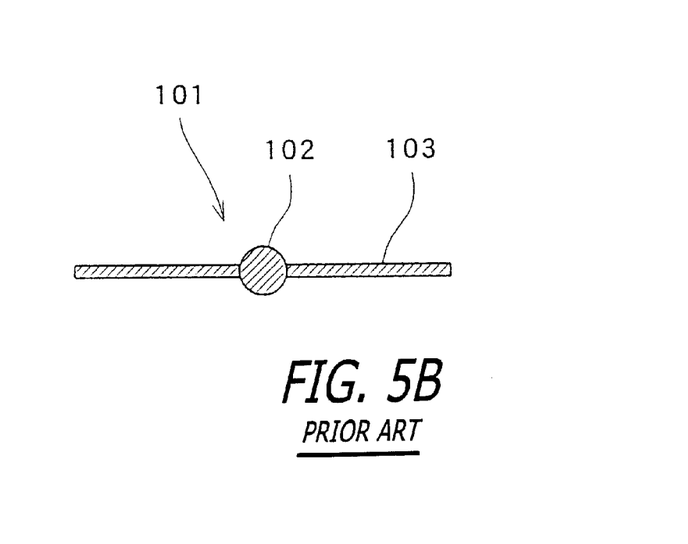

Cutting blades for a reaper that serve to cut fruit, branches and leaves or roots of plants by utilizing reciprocation of the cutting blade exist in the prior art, for example, Japanese Laid-open Patent Publication No. Hei 7-95827 which discloses a cutting blade for cutting the roots of plants. FIGS. 5A, 5B are views showing the prior art structure of the cutting blade for the root cutter, FIG. 5A being a front view and FIG. 5B being a sectional view taken along the line Vb—Vb of FIG. 5A.

In FIGS. 5a, 5B, the exemplary prior art cutting blade 101 for a root cutter is constructed such that a plate-shaped blade member 103 extends like a rectangular plate having a predetermined width from the tip part of a bar-shaped shank member 102. When the cutting blade 101 for the root cutter having such a structure is used, a base end portion of the shank member 102 thereof is fixed to the root cutter (not shown) including a striking mechanism such that it can axially reciprocate by a predetermined distance. Then, the cutting blade 101 axially reciprocates upon receipt of striking force from the root cutter, thereby cutting the roots of plants and the like.

Figure 6A:
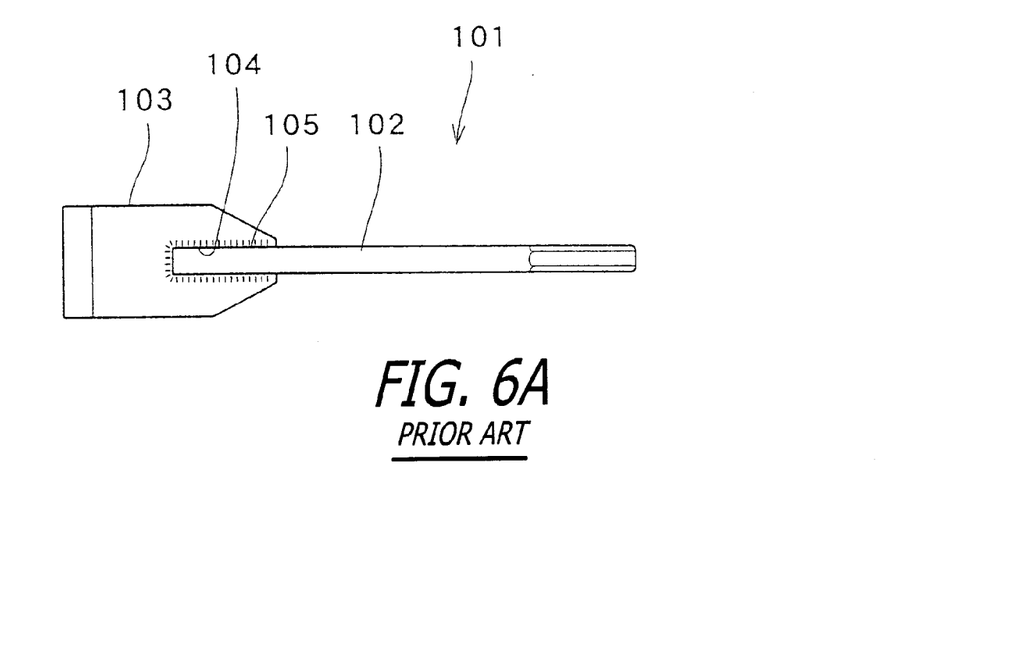
FIGS. 6A, 6B are views showing a method for manufacturing a cutting blade by welding a plate-shaped blade member to a tip portion of a shank member fitted in a notch portion formed on a base end thereof, FIG. 6A being a front view showing a finished state, and FIG. 6B being a view showing a manufacturing process.
Figure 6B:
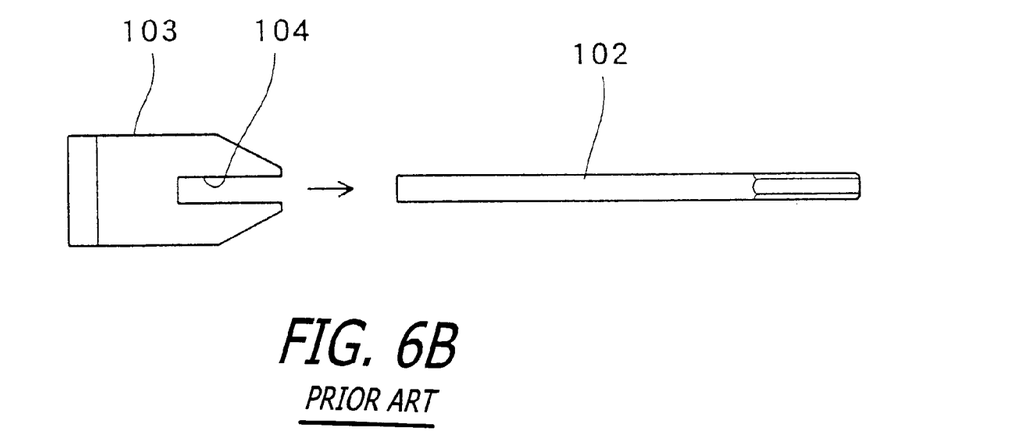
Figure 7A:
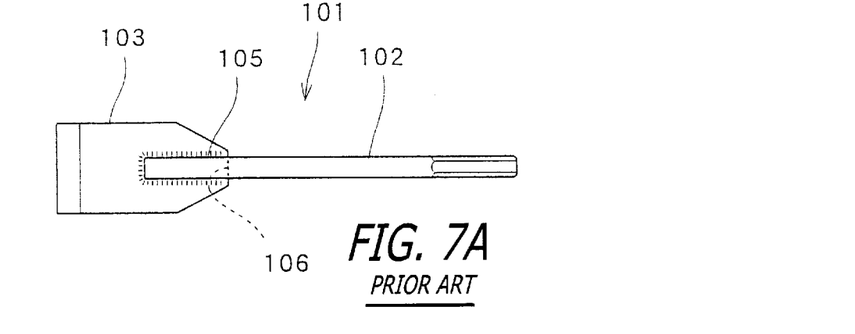
FIGS. 7A, 7B, 7C, 7D are views showing a method for manufacturing a cutting blade by welding a shank member to a base end portion of a plate-shaped blade member fitted in a slit formed on a tip portion thereof, FIG. 7A being a front view showing a finished state, FIG. 7B being a front view showing a manufacturing process, FIG. 7C being a plan view showing the manufacturing process, and FIG. 7D being a perspective view showing the slit of the shank member.
Figure 7B:
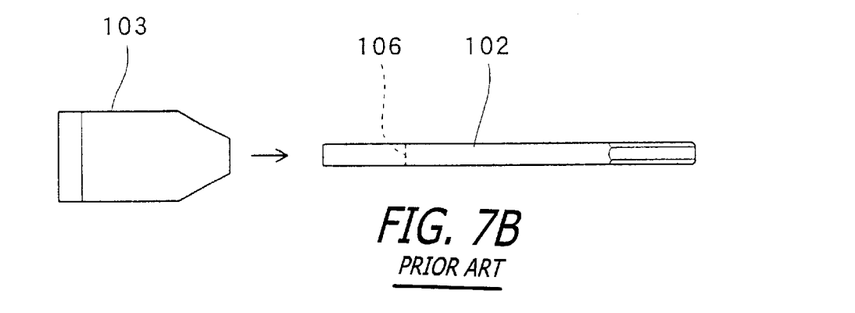
Figure 7C:
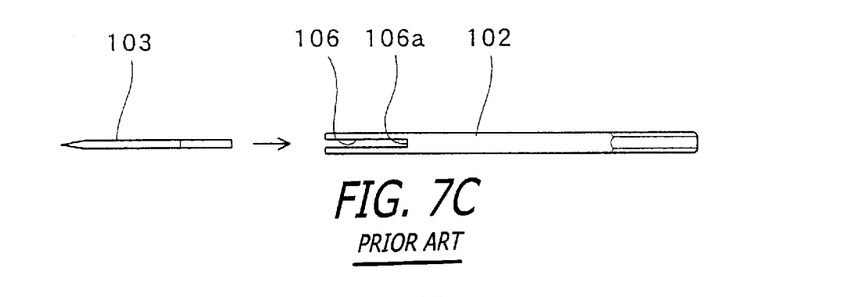
Figure 7D:
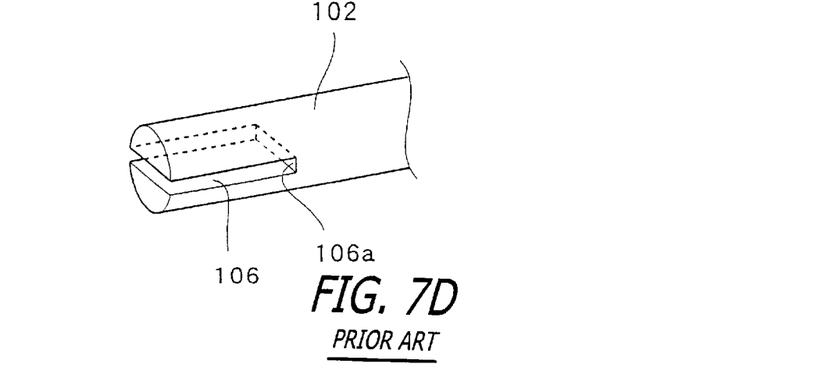

There has been known a method for manufacturing the cutting blade 101 by integrally forming the shank member 102 and the plate-shaped blade member 103 or by welding the plate-shaped blade member 103a to the shank member 102a, as shown in FIGS. 6 and 7. For example, a rectangular notch portion 104a is formed on the base end portion of the plate-shaped blade member 103a as shown in FIGS. 6A and 6B. A tip portion of the bar-shaped shank member 102a is fitted into the notch portion 104 of the plate-shaped blade member 103a, and the fitted tip portion of the shank member 102a is welded to an edge portion of the notch portion 104a (a portion of the plate-shaped blade member 103a that fronts the notch portion 104a). Thus, the assembled cutting blade 101a is manufactured. Alternatively, as shown in FIGS. 7A, 7B, 7C and 7D, a slit 106b extending in the axial direction is formed in the central portion of a tip portion of the shank member 102b. The base end portion of the plate-shaped blade member 103b is fitted into the slit 106b of the shank member 102b, and the fitted base end portion of the plate-shaped blade member 103b is welded to the tip portion of the shank member 102b. Thus, the cutting blade 101b is manufactured.

It is hard to manufacture the cutting blade 101 for the root cutter by integrally forming the plate-shaped blade member 103 and the shank member 102 by forging, and, in particular, to manufacture, by the forging, the cutting blade 101 including a plate-shaped blade member which is thin and has a large area because of man-hour time that is taken.

In the method for manufacturing a cutting blade as shown in FIGS. 6A, 6B, it is difficult to position the plate-shaped blade member 103a with respect to a shaft axis of the shank member 102a in a direction of the thickness without an offset when the shank member 102a is welded to the plate-shaped blade member 103a.

If the plate-shaped blade member 103a is welded to have the offset with respect to the shaft axis of the shank member 102a, the cutting performance of the cutting blade 101a is affected. Therefore, it is necessary to specially use a jig for fixing the plate-shaped blade member 103a to the shank member 102a. Moreover, welding the plate-shaped blade member 103a to the shank member 102a is sequentially performed along the shank member 102a from an end thereof. Therefore, the welding is greatly affected by a distortion (thermal distortion) or the like. Consequently, the skills for the welding is required in order to reduce the influence of the welding distortion or the like as much as possible.

In the method for manufacturing a cutting blade shown in FIGS. 7A, 7B, 7C, 7D, it is difficult to position the plate-shaped blade member 103b in a transverse direction with respect to the shank member 102b during the welding. For this reason, the same problems as in FIGS. 6A, 6B arise with regard to the offset of the plate-shaped blade member 103b in the transverse direction. Furthermore, an innermost wall surface 106b of the slit 106b of the shank member 102b is not welded. Therefore, there is a problem in that the strength of the connecting portion of the shank member 102b and the plate-shaped member 103b is reduced.

SUMMARY OF THE INVENTION

In order to solve the above-mentioned problems, it is an object of the invention to provide a cutting blade for a reaper, which can easily position members to be welded, can reduce a welding distortion, can fully ensure the strength of a shank member and can be manufactured easily.

The invention provides a cutting blade to be used for a reaper that serves to cut off plants by reciprocation of the cutting blade, comprising, a bar-shaped shank member which has a groove formed on an outer peripheral face of a tip portion to extend in an axial direction and whose base end portion is to be fixed to the reaper, and a plate-shaped blade member having a notch portion formed on a base end portion and having a cutting portion formed in a tip portion, the cutting portion extending in a direction which is substantially perpendicular to the axial direction of the shank member, wherein the tip portion of the shank member is fitted into the notch portion of the plate-shaped blade member in such a manner that an edge portion of the notch portion is fitted into the groove, and the fitted tip portion of the shank member is welded to a portion of the plate-shaped blade member which is located around the tip portion. With such a structure, the plate-shaped blade member is positioned in a direction of the thickness and width (transverse) with respect to the shank member without an offset from a shaft axis of the shank member through the fitting of the groove of the shank member to the edge portion of the notch portion of the plate-shaped blade member. Moreover, a thermal distortion can be relieved by the grooves of the shank member, and the strength of the shank member can also be ensured easily because an unwelded face in a cross-sectional direction is not formed in the shank member. Accordingly, it is possible to easily manufacture a thin plate-shaped cutting blade having a large area.

In the above-mentioned case, preferably, two grooves of the shank member are formed on the outer peripheral face of the shank member along the shaft axis thereof to front toward opposite directions with each other on the same plane, and the edge portions of the notch portion of the plate-shaped blade member which are opposite to each other are fitted into the grooves respectively.

These objects as well as other objects, features and advantages of the invention will become more apparent to those skilled in the art from the following description with reference to the accompanying drawings.

DETAILED DESCRIPTION OF THE PREFERRED EMBODIMENT

An embodiment of the invention will be described below with reference to the drawings.

Figure 1:
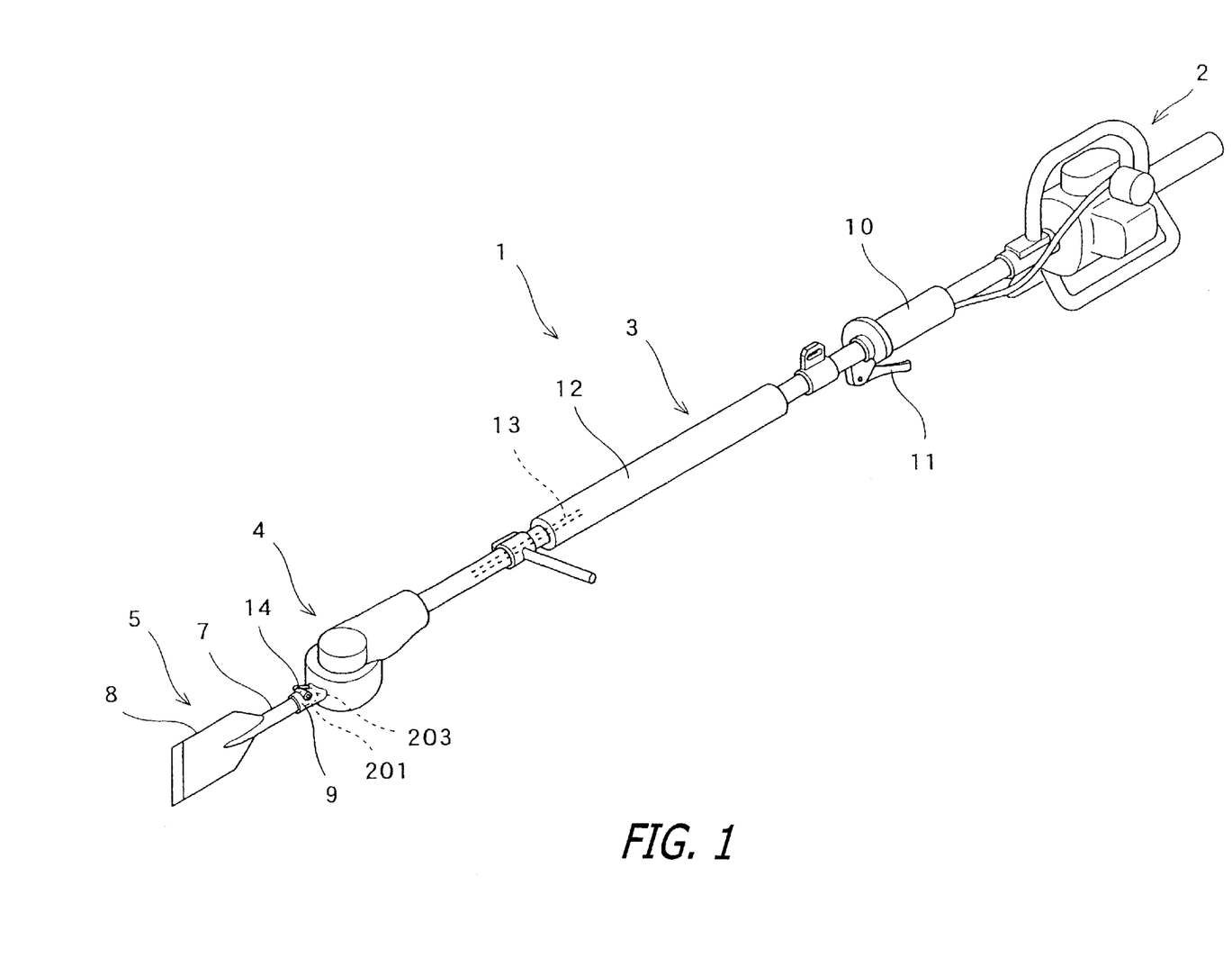
FIG. 1 is a perspective view showing the schematic structure of a reaper using a cutting blade for the reaper according to an embodiment of the invention.

FIG. 1 is a perspective view showing a power driven portable reaper using a cutting blade according to the embodiment of the invention. First of all, the basic structure of the power driven portable reaper will be described with reference to FIG. 1. A power driven portable reaper 1 (which will be hereinafter referred to as a "reaper") mainly comprises an engine 2, a rod member 3, a impact force generating unit 4, and a cutting blade 5 for the reaper 1 (which will be hereinafter referred to as a "cutting blade").

The engine 2 generates rotating force. The rod member 3 connects the engine 2 to the impact force generating unit 4. The rod member 3 consists of a hollow pipe and a drive shaft 13 passes through the inside of it. The rotating force generated by the engine 2 is transmitted to the impact force generating unit 4 by the drive shaft 13. The impact force generating unit 4 converts the rotating force generated by the engine 2 into continuous striking force (impact force) of reciprocation.

Figure 3A:
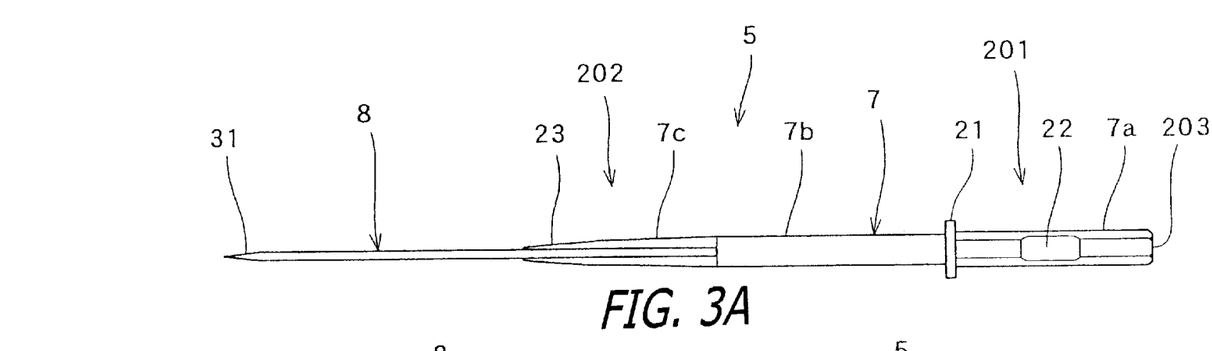
FIGS. 3A, 3B are views showing the structure of the cutting blade for the reaper according to the embodiment of the invention, FIG. 3A being a plan view, and FIG. 3B being a front view.
Figure 3B:
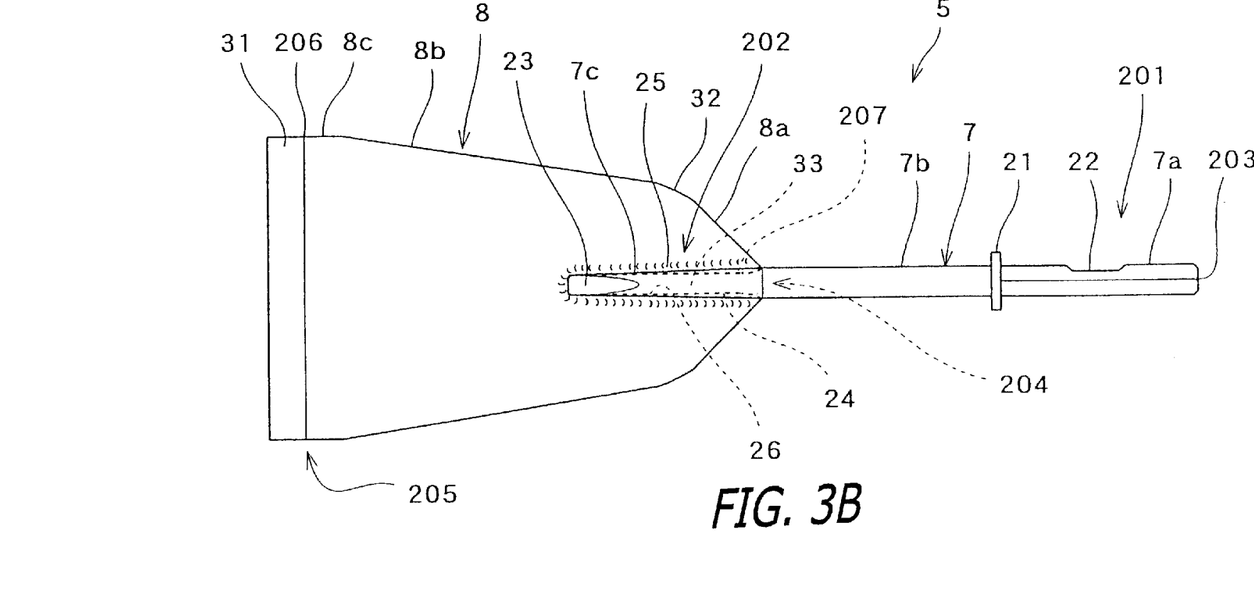

The cutting blade 5 is formed by means of welding a plate-shaped blade member 8 to a bar-shaped shank member 7. A base end portion 201 of the shank member 7 (see FIG. 3) is inserted into a blade attaching portion 9 of the impact force generating unit 4 and is fixed by means of an engaging clamp 14. The shank member 7 is fixed to the blade attaching portion 9 such that it can reciprocate by a predetermined length in the longitudinal direction of the reaper 1. A base end face 203 of the shank member 7 (see FIG. 3) is periodically struck with the striking force generated by the impact force generating unit 4. The striking force is directed from the base end of the shank member 7 toward the tip of the plate-shaped blade member 8.

A first grip portion 10 and a second grip portion 12 are formed in the rod member 3 of the reaper 1, and an operation lever 11 is attached to it adjacently to the first grip portion 10. The operation lever 11 serves to control an engine speed. The engine 2 and the drive shaft 13 penetrating the rod member 3 are connected to each other through a centrifugal clutch (not shown). When the operation lever 11 is released to bring the engine 2 into an idling state, the centrifugal clutch is brought into a disconnecting state so that the rotating force of the engine 2 is not transmitted to the impact force generating unit 4. When the operation lever 11 is gripped more tightly, (the operating amount is increased), the engine speed is gradually increased so that the centrifugal clutch is connected. Thus, the impact force generating unit 4 starts periodic striking upon the shank member 7 of the cutting blade 5. When the operation lever 11 is gripped much more tightly, the engine speed is increased so that a striking cycle is shortened.

Figure 2A:
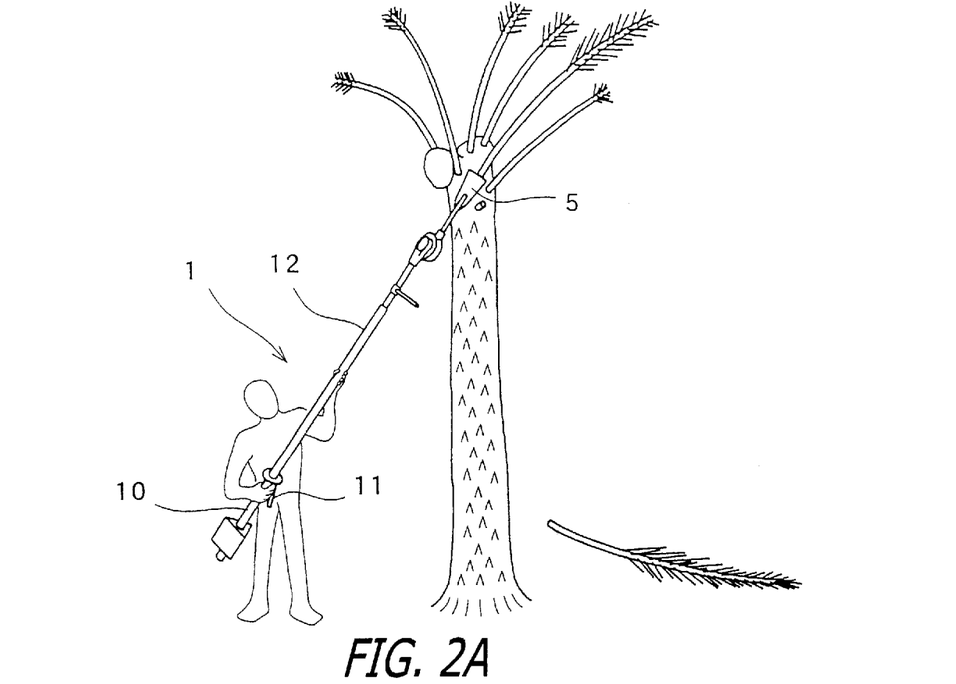
FIGS. 2A, 2B are views showing a state in which the reaper of FIG. 1 is used, FIG. 2A being a view showing a state in which fruit and branches of oil palm are cut off by the reaper, and FIG. 2B being a view showing a state in which roots of plants are cut off by the reaper.
Figure 2B:
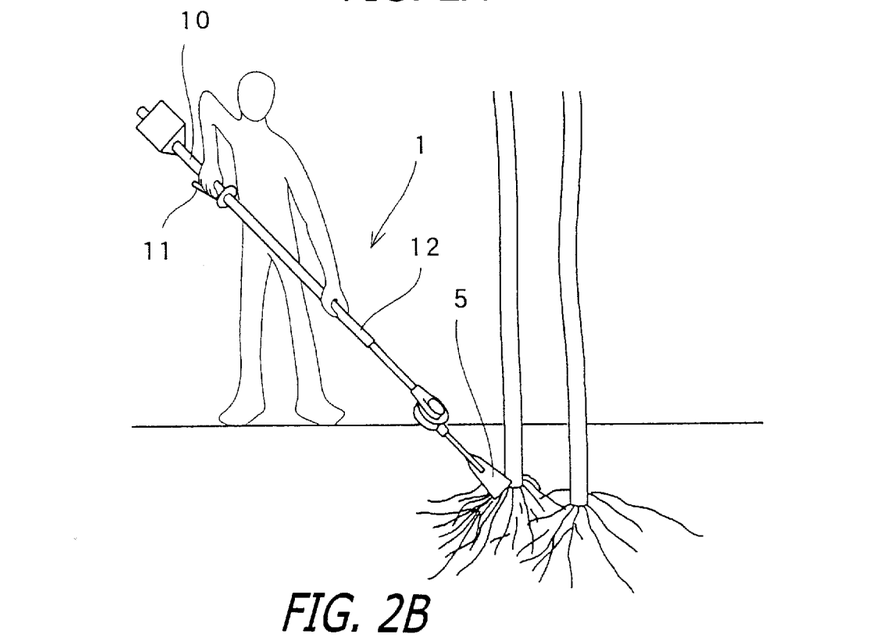

A method for using the reaper 1 will be described below with reference to FIGS. 2A, 2B. FIGS. 2A, 2B show a state in which the reaper is used, FIG. 2A illustrating a state in which fruit and branches of oil palm are cut off by the reaper and FIG. 2B illustrating a state in which roots of plants are cut off by the reaper.

In FIG. 2A, an operator grips the first grip 10 and the second grip 12 by both hands, thereby supporting the reaper 1. One of the hands operates the operation lever 11 while gripping the first grip 10. The operator presses the cutting portion (the tip) of the cutting blade 5 against the base portion of the branch or the stem portion of the fruit while adjusting a striking cycle by the operation of the operation lever 11, thereby cutting off the branches or the fruit by striking force.

In FIG. 2B, the operator operates the operation lever 11 while supporting the reaper 1 by both hands. Then, the operator presses the cutting portion of the cutting blade 5 against the root of the plant in the ground while adjusting the striking cycle by the operation of the operation lever 11, thereby cutting off the root by the striking force.

Figure 4A:
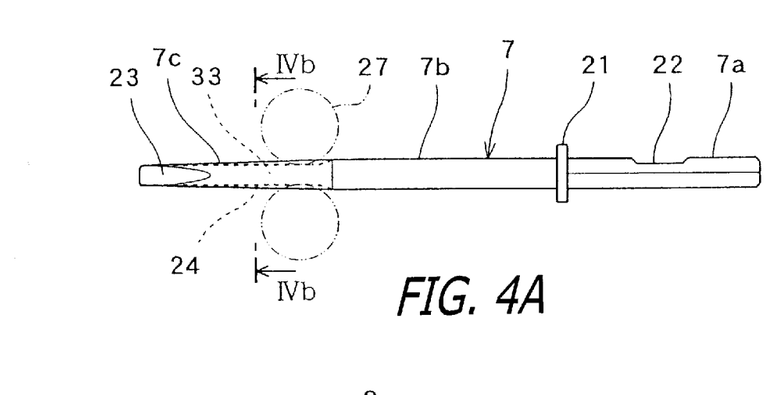
FIGS. 4A, 4B, 4C are views showing a method for manufacturing the cutting blade for the reaper illustrated in FIGS. 3A, 3B, FIG. 4A being a view showing a process for forming grooves in a shank member, FIG. 4B being a sectional view taken along the line IVb—IVb in FIG. 4A, and FIG. 4C being a view showing a process for assembling a plate-shaped blade member into the shank member.
Figure 4B:
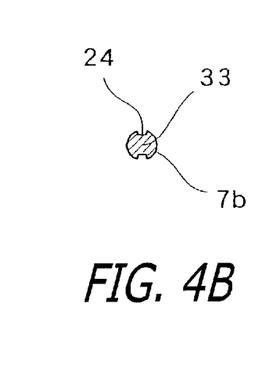
Figure 4C:
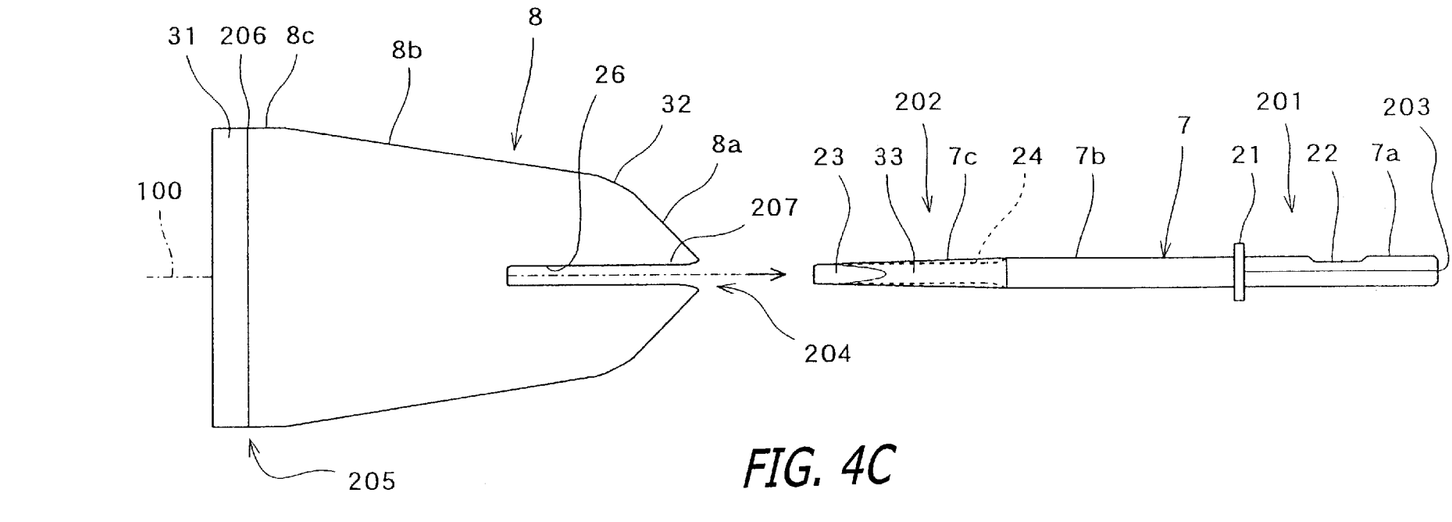

Next, the cutting blade according to the embodiment of the invention will be described. FIGS. 3A, 3B are views showing the structure of the cutting blade 5 according to the embodiment, FIG. 3A being a plan view and FIG. 3B being a front view. FIGS. 4A, 4B, 4C are views showing a method for manufacturing the cutting blade of FIGS. 3A, 3B, FIG. 4A being a view showing a process for forming grooves in the shank member, FIG. 4B being a sectional view taken along the line IVb—IVb in FIG. 4A, and FIG. 4C being a view showing a process for assembling a plate-shaped blade member into the shank member.

As shown in FIGS. 3A, 3B, 4A and 4B, the shank member 7 of the cutting blade 5 is a straight column-shaped member in which a fixing portion 7a for fixing to the reaper is formed on the base end 201, a connecting portion 7b is formed in a central portion, an attaching portion 7c for attaching the plate-shaped blade member 8 is formed on a tip portion 202, and a flange 21 is formed between the fixing portion 7a and the connecting potion 7b.

The fixing portion 7a has a hexagonal prism shape. An engaging concave portion 22 is provided to axially extend over a predetermined length in the central portion of an outer peripheral face of the fixing portion 7a. The engaging concave potion 22 serves to engages with the engaging clamp 14 (see FIG. 1) of the blade attaching portion 9 of the reaper 1. The flange 21 functions as a stopper of the shank member 7 when the fixing portion 7a of the cutting blade 5 is inserted into the blade attaching portion 9 of the reaper 1 (see FIG. 1). The connecting portion 7b in the central portion is a body part of the shank member 7, and has a cylindrical shape. The attaching portion 7c has a circular section as a whole shape, and is formed to rectilinearly reduce a diameter from the connecting portion 7b toward a tip. A pair of grooves 24 are formed to axially extend over the whole length of the attaching portion 7c on the outer peripheral face of the attaching portion 7c, the grooves 24 being positioned opposite to each other with a central axis interposed therebetween. The grooves 24 have such a width as to just fit the plate-shaped blade member 8 which will be described below, that is, a width that is slightly greater than a thickness of the plate-shaped blade member 8. Moreover, a bottom face of the groove 24 is formed in parallel with the central axis of the attaching portion 7c. Accordingly, the groove 24 gradually becomes shallower toward the tip. As is apparent from FIGS. 3A and 3B, particularly, a chamfered face 23 is formed on upper and lower faces (in a direction of the thickness of the plate-shaped blade member 8) on the tip portion of the attaching portion 7c in such a manner that a difference in height with the plate-shaped blade member 8 is gradually reduced toward the tip. The shank member 7 consists of steel or the like.

As shown in FIGS. 3A and 4C, the plate-shaped blade member 8 is a thin plate-shaped, and has a shape symmetrical with respect to a virtual center line 100 extending from the base end 204 toward the tip. The plate-shaped blade member 8 has a cutting portion 31 which extends like a band in a direction perpendicular to the center line 100 in the tip portion 205. Moreover, the plate-shaped blade member 8 has a notch portion 26 formed in the central portion of the base end 204 to extend along the center line 100. Each of both side edges of the plate-shaped blade member 8 has such a shape that a portion 8c extending from the tip of the cutting portion 31 to a position which slightly passes through the base end 206 of the cutting portion 31 is parallel with the center line 100, a portion 8b extending from there to the vicinity of the central portion of the notch portion 26 is gently inclined like a straight line and a portion 8a extending from there to the base end 204 is steeply inclined like a straight line. A curved transition portion 32 for gradual transition of the inclination is formed in portions of the both side edges where the gentle inclination is changed to the steep inclination. The notch portion 26 has such a shape that a portion 33 situated between the grooves 24 of the attaching portion 7c of the shank member 7 is just fitted therein. More specifically, the notch portion 26 is formed to have a width that is slightly greater than a distance between the bottom faces of the both grooves 24 and to have a length almost equal to the length of each of the grooves 24, that is, the length of the attaching portion 7c of the shank member 7. The thickness of the plate-shaped blade member 8 is constant excluding the cutting portion 31. The cutting portion 31 is formed to have a wedge-shaped longitudinal sectional shape. The plate-shaped blade member 8 consists of steel or the like.

In a state in which the edge portion 207 of the notch portion 26 of the plate-shaped blade member 8 is fitted in the grooves 24 of the attaching portion 7c of the shank member 7, that is, the portion 33 situated between the grooves 24 of the attaching portion 7c is fitted into the notch portion 26 of the plate-shaped blade member 8, the attaching portion 7c is welded to portions of a surface and a back face of the plate-shaped blade member 8 which are located around the attaching portion 7c (the reference numeral 25 denotes the welding). Thus, the plate-shaped blade member 8 is fixed to the shank member 7.

Next, a method for manufacturing the cutting blade 5 having the above-mentioned structure will be described in detail with reference to FIGS. 3A, 3B, 4A, 4B and 4C. As shown in FIG. 4A, the grooves 24 of the attaching portion 7c of the shank member 7 are machined in such a manner that a disk-shaped rotating cutter 27 moves in the axial direction of the shank member 7. Thereby, the pair of grooves 24 are formed on the attaching portion 7c. As a matter of course, the grooves 24 may be processed by other means such as a broach or the like. As shown in FIG. 4C, the edge portion 207 of the notch portion 26 of the plate-shaped blade member 8 is fitted into the grooves 24 of the attaching portion 7c of the shank member 7. Thereby, the plate-shaped blade member 8 is assembled into the shank member 7. More specifically, the portion 33 situated between the grooves 24 of the attaching portion 7c is fitted into the notch portion 26 of the plate-shaped blade member 8. Consequently, the plate-shaped blade member 8 is positioned in a transverse direction thereof through the fitting of the notch portion 26 to the portion 33 situated between the grooves 24 of the attaching portion 7c, and is positioned in a direction of the thickness thereof through the fitting of the edge portion 207 of the notch portion 26 into the groove 24.

As shown in FIGS. 3A, 3B, subsequently, the portions of the surface and back face of the assembled plate-shaped blade member 8 which are located around the attaching portion 7c of the shank member 7 are welded to the attaching portion 7c (the reference numeral 25 denotes the welding). In this case, the edge portion 207 of the notch portion 26 of the plate-shaped blade member 8 is restrained by the groove 24 of the attaching portion 7c in the direction of the thickness. Therefore, even if the welding is sequentially carried out from an end, a welding distortion is reduced in the end on the side where the welding is completed. Accordingly, the welding does not particularly require the skills. Furthermore, since the plate-shaped blade member 8 can be firmly positioned, the welding can be performed automatically. Thus, a cost can be reduced. Differently from the case where a slit is formed on the tip of the shank member, an unwelded face in a cross-sectional direction is not generated in the shank member 7. Therefore, the strength of the shank member 7 is not reduced.

While the groove 24 has been provided on both sides of the attaching portion 7c of the shank member 7 in the above description, it may be provided on either side for simplification. While the groove 24 has been provided over the whole length of the attaching portion 7c of the shank member 7, it may be provided in a part thereof. In FIG. 3, for example, the base end portion of the attaching portion 7c of the shank member 7 (which is adjacent to the connecting portion 7b) may be a diameter reducing part and the other portion may be a part having a constant diameter that is almost equal to the width of the notch portion 26 of the plate-shaped blade member 8. The groove 24 may be provided in the diameter reducing part.

Numerous modifications and alternative embodiments of the invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A cutting blade to be attached to a reaper that serves to cut off plants by reciprocation of the cutting blade, comprising;

a bar-shaped shank member which has a groove formed on an outer peripheral face of a tip portion to extend in axial direction and whose base end portion is to be fixed to the reaper; and a plate-shaped blade member having a notch portion formed on a base end, the notch portion extending on a center axis of the blade member, and having a cutting portion formed in a tip portion, the cutting portion extending in a direction which is substantially perpendicular to the center axis of the blade member, wherein the tip portion of the shank member is fitted into the notch portion of the plate-shaped blade member in such a manner that an edge portion of the notch portion is fitted into the groove, and the fitted tip portion of the shank member is welded to a portion of the plate-shaped blade member which is located around the tip portion.

2. The cutting blade for the reaper according to claim 1, wherein two grooves of the shank member are formed on portions of the outer peripheral face of the shank member which are situated on opposite sides with respect to a shaft axis thereof along the shaft axis, and the edge portions of the notch portion of the plate-shaped blade member which are opposite to each other are fitted into the grooves respectively.

\* \* \* \* \*